United States Patent [19]

Baker

[11] 4,026,064
[45] May 31, 1977

[54] PROTECTIVE BOX FOR RODENT BAIT

[75] Inventor: Stanley Z. Baker, Cleveland Heights, Ohio

[73] Assignee: J. T. Eaton Company, Cleveland, Ohio

[22] Filed: May 17, 1976

[21] Appl. No.: 686,794

[52] U.S. Cl. .................................................. 43/131
[51] Int. Cl.² ....................................... A01M 25/00
[58] Field of Search ........... 43/131; 119/51; 206/72

[56] References Cited

UNITED STATES PATENTS

| | | | |
|---|---|---|---|
| 1,393,590 | 10/1921 | Vaden, Jr. | 43/131 |
| 2,781,607 | 2/1957 | Smiley | 43/131 |
| 2,944,364 | 7/1960 | Kelly | 43/131 |
| 3,008,262 | 11/1961 | Ronicker | 43/131 |
| 3,656,681 | 4/1972 | Goings | 206/72 |

Primary Examiner—Warner H. Camp
Attorney, Agent, or Firm—Meyer, Tilberry & Body

[57] ABSTRACT

A metal rodent bait protection box is provided with a removable disposable plastic feed tray which has indentations which coact with the box indentations to retain the tray in proper position. The lid of the box is provided with an overhanging portion which prevents contamination of the bait. The access hole is located a distance above the base of the box to help in preventing contamination.

6 Claims, 4 Drawing Figures

PROTECTIVE BOX FOR RODENT BAIT

The present invention relates generally to the art of rodent bait containers. More specifically, the invention relates to metal protection box having a securely engaging lid in which a separate, disposable bait tray is installed.

Providing a feeding station for the poisoning of rodents has long been a problem with regard to the safety of domesticated animals. There was the difficulty of assuring that only the undesirable vermin were poisoned when it was necessary to place such bait in areas where domesticated animals were likely to be present.

Enclosed bait boxes were developed which had private feeding stations therewithin and which were accessible only to small animals through holes provided in the sides of the boxes.

One type of box was made in a single stamped piece with compartments formed therein for holding various wet and/or dry baits within the box. The boxes were also provided with securing means through their bottoms or sides for attaching the boxes permanently to a floor or other structure. Such boxes were closed with an interfitting lid which protected the bait and which could be removed for cleaning and refilling of the feeding station. A box of this type is shown in Design Pat No. 236,114, issued July 29, 1975.

There were several problems associated with such prior art devices, however. The access holes were in a position which allowed moisture to enter the box and contaminate the bait inside. The lids also permitted contamination of the bait because they were either ill fitting or seeped moisture through the junction of the lid with the base of the box.

The worst and most expensive problem associated with such prior art bait boxes was that they were difficult to clean and refill after use which often led to the necessity of disposal and replacement of the entire box after only one or two fillings.

It is therefore a principal object of this invention to provide a safe, inexpensive, long-life rodent bait protection box which avoids contamination of the bait through the access holes and around the lid.

It is another object of this invention to provide a rodent bait protection box which avoids moisture contamination of the bait by having access holes which are disposed in the side of the bait box at a location above the bottom of the base of the box.

It is yet another object of the present invention to provide a rodent bait protection box which avoids bait contamination around the lid of the box by having an overhanging lip on the box lid which may snap into proper position to avoid seepage of moisture into the feeding chamber.

It is a still further object of this invention to provide a rodent bait protection box which has an inexpensive, removable, disposable feeding tray which can be inserted into the feeding chamber and conveniently cleaned or disposed of when empty to be replaced by a clean, filled bait tray.

These and other objects are accomplished by the present invention as will become apparent to those skilled in the art through the understanding of the description of a preferred embodiment of the invention taken in conjunction with the accompanying drawings.

BRIEF DESCRIPTION OF THE DRAWINGS

A preferred embodiment of the invention is illustrated in the accompany drawings in which.

DETAILED DESCRIPTION OF THE PREFERRED EMBODIMENT AND THE DRAWINGS

Figure 1:
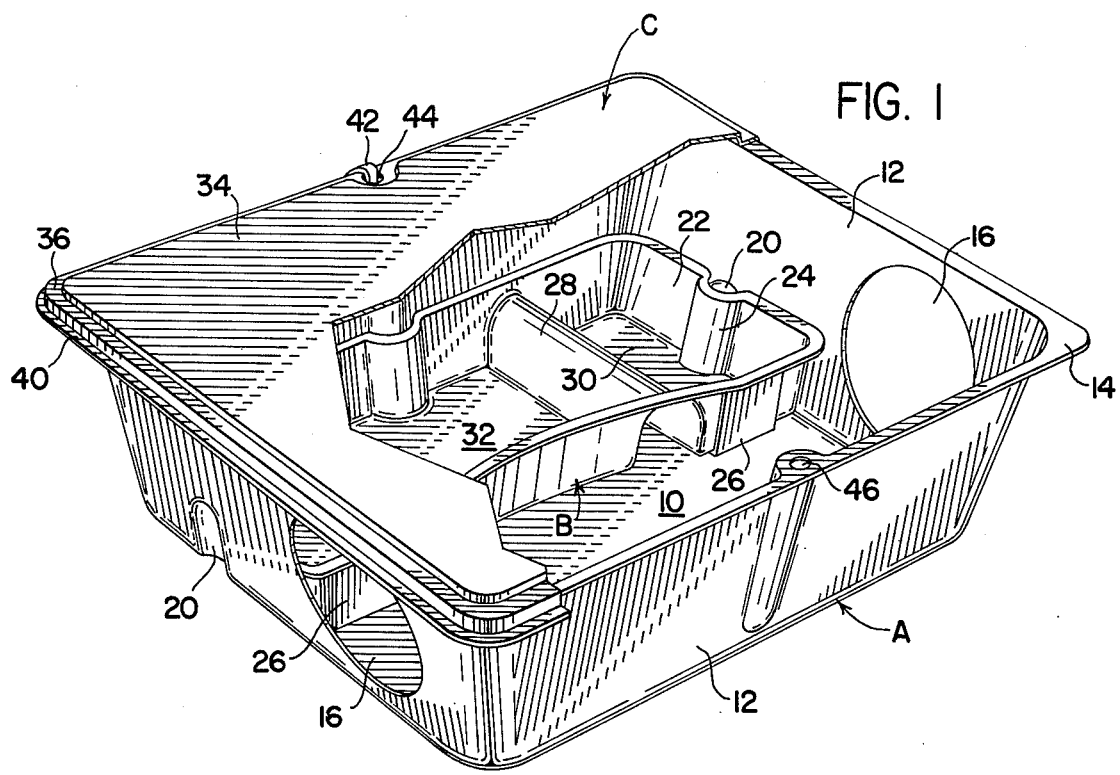
FIG. 1 is a perspective view in partial section of a bait protection box in accordance with a preferred embodiment of the present invention.
Figure 2:
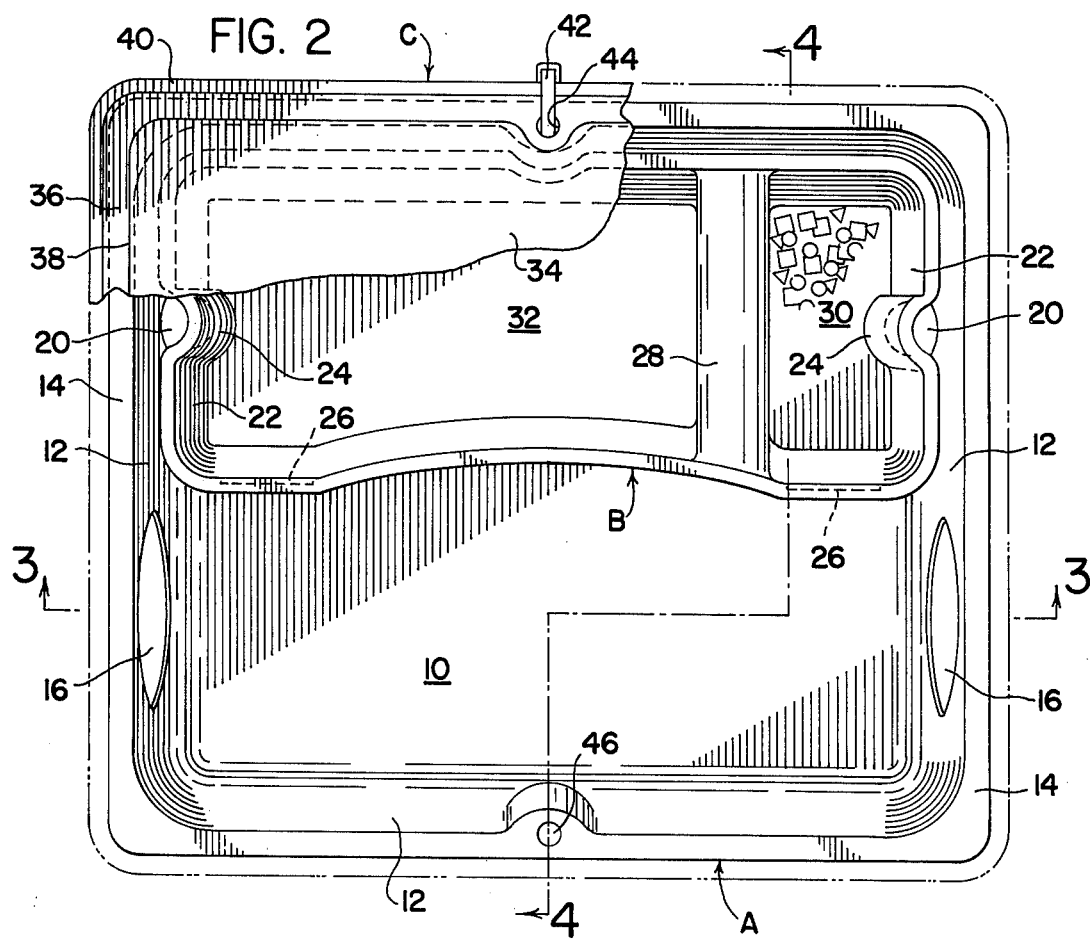
FIG. 2 is a plan view of the bait box shown in FIG. 1 in which a portion of the lid has been sectionally removed to show the interior feeding chamber of the box.

A preferred embodiment of a bait protection box in accordance with the invention is shown in the Figures comprising a box base A, a removable feed tray B and a lid C. Box base A is comprised of bottom portion 10 upstanding side walls 12 and lip 14 extending outwardly from the top of side walls 12. Access holes 16 are provided in the upstanding side walls 12 of the box base A.

It has been found that box base A and lid C are more durable and safe when made of metal. Thus, these parts are preferably stamped in one piece from galvanized sheet steel. The use of such a heavy, ductile material rather than plastic increases the safety of the box because it is less likely to be broken into by large animals.

For convenience and cost savings, feed tray B is preferably made of a molded plastic such as polyethlyene, PVC or ABS.

In order to retain feed tray B in proper position withing the box, indentations 20 are provided in the upstanding side walls 12 of box base. The side walls 22 of feed tray B have recesses 24 molded therein which coact with these indentations 20 to retain the tray B. A pair of L-shaped tabs 26 one leg of each of which is secured to the bottom 10 of box base and the other leg of which extends upwardly in the middle of the box away from side walls 22 thereof also act to retain the feed tray B in place.

Feed tray B is preferably divided by wall 28 passing between opposite feed tray side walls 22 into two chambers 30 and 32 for holding both liquid and/or solid baits and/or water within the tray.

Figure 4:
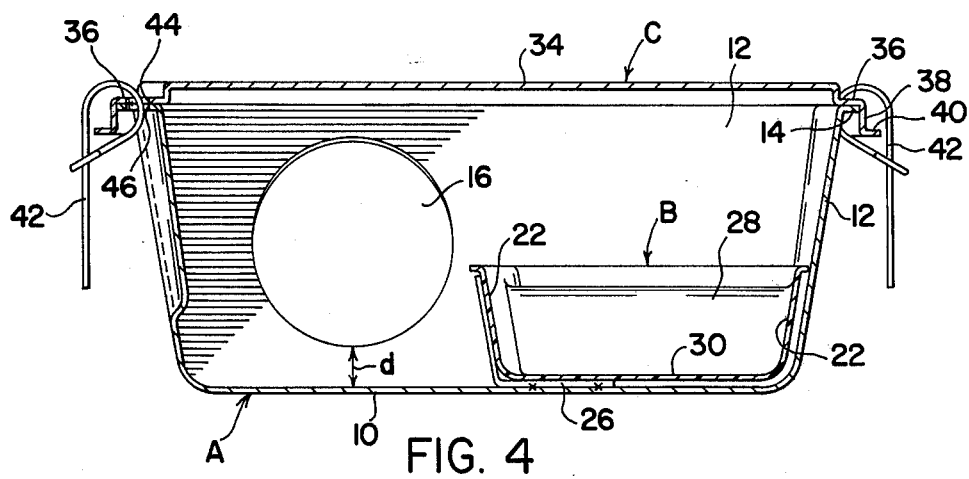
FIG. 4 is a side elevational view of another section of the box shown in FIG. 2 taken along line 4—4 thereof.

As best shown in FIG. 4, access hole 16 is located at a distance d above and apart from the bottom 10 of box base A leaving a lip or edge extending above floor level in order to prevent or at least substantially reduce the possibility of moisture seepage into the interior of the box in the event of flooding of the floor on which the box is positioned.

Figure 3:
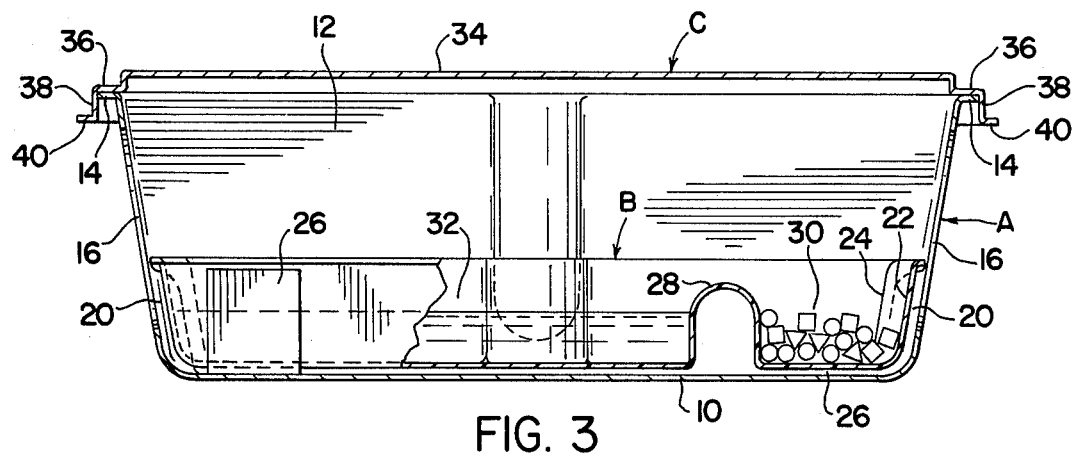
FIG. 3 is a side elevational view of a section of the box shown in FIG. 2 taken along line 3—3 thereof.

As best shown in FIG. 3, the upper peripheral edge of side walls 12 of the box base A is provided with an outwardly extending lip portion 14. Lid C is provided with a large flat planar top portion 34 and a peripheral edge portion 36 extending therearound which portion rests on lip 14 of box base A when lid C is in its installed position thereon. Edge portion 36 may be coplanar with top portion 34 or in a plane parallel thereto as shown.

Outwardly of edge portion 36 is downwardly extending overhang portion 38 which passes outwardly of lip 14 when lid C is installed. In the preferred embodiment, overhang portion 38 is bent slightly inwardly so as to yieldably engage lip 14 and act to lock lid C onto box base A. Outwardly extending portion 40 along the lowermost edge of overhang portion 38 may be provided to facilitate the smooth snap-lock of lid C onto box base A through the action of inwardly bent overhang portion 38 against lip 14.

Additional assurance of the retention of lid C onto box base A is provided for by passing securing means such as a nut and bolt or preferably a one-way nylon tie 42 through holes 44 and 46 provided in lid C and box base A respectively as shown in the figures.

While the invention has been described in terms of the more limited aspects of a preferrred embodiment, it will be understood by those skilled in the art that the invention may take form in various other parts and arrangements of parts all of which are within the scope of the invention as defined and limited only by the appended claims.

Having thus described my invention, I claim:

1. A rodent bait protection box comprising a one piece metal box base portion having a bottom and a plurality of side walls defining an interior thereof;

a metal lid for covering said box base portion and having a peripheral edge portion and a downwardly extending overhang portion around said edge portions to extend beyond a corresponding tip portion on the top peripheral edges of said side walls of said box base;

at least one access hole disposed in at least one of said side walls of said body portion and located thereon a distance above the bottom of said box base portion and a removable feed tray having a plurality of indentations therein in the interior of said box base for holding rodent bait, said tray being retained within said box by retainer means comprising a plurality of indentations in said box base which correspond to and coact with said plurality of indentations in said feed tray when installed in said box base.

2. The device of claim 1 wherein said feed tray is a compartmented disposable plastic tray.

3. The device of claim 1 further including securing means for positively retaining said lid on said box base.

4. The device as described in claim 1 wherein said overhang portion of said lid is bent inwardly so as to positively engage said lip portion.

5. The device as described in claim 4 further including securing means for positively retaining said lid on said box base.

6. The device as described in claim 5 wherein said feed tray is a compartmented disposable plastic tray.

* * * * *